Dec. 9, 1930.  F. CLASEN ET AL  1,784,339
FILTERING APPARATUS
Filed Dec. 21, 1928   2 Sheets-Sheet 1

Inventors
Friedrich Clasen.
Heinrich Lenckerstort.
by A.W. Dohm,
Attorney.

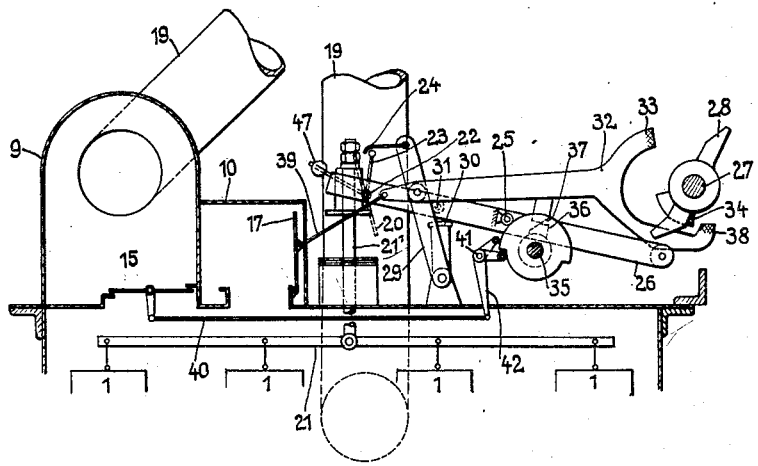
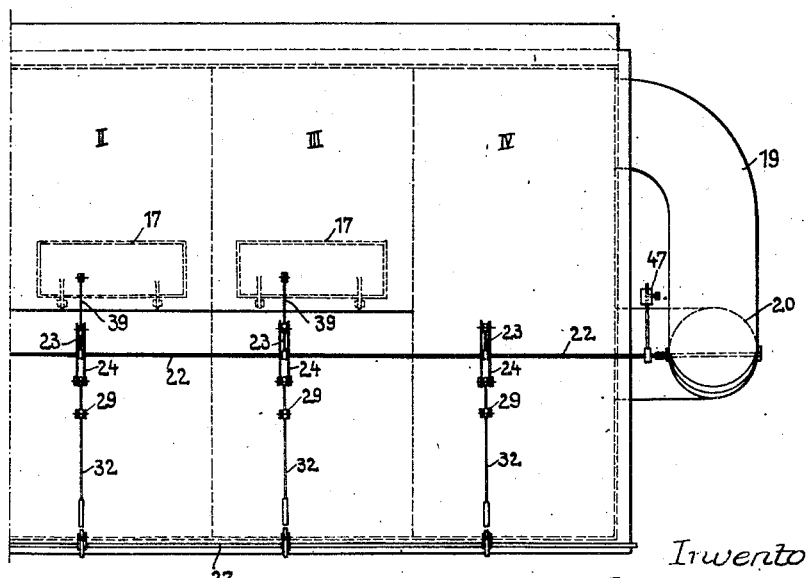

Patented Dec. 9, 1930

1,784,339

UNITED STATES PATENT OFFICE

FRIEDRICH CLASEN, OF LUBECK, AND HEINRICH LENCKERSTORF, OF STOCKELSDORF, GERMANY, ASSIGNORS TO MASCHINENFABRIK BETH, AKTIENGESELLSCHAFT, OF LUBECK, GERMANY, A CORPORATION OF GERMANY

FILTERING APPARATUS

Application filed December 21, 1928, Serial No. 327,619, and in Germany October 1, 1928.

Our invention relates to improvements in filtering apparatus having tubular filtering members, and more particularly in filtering apparatus of the type in which in addition to the main filtering members a set of subsidiary filtering members is provided in which the dust is removed from the air used for cleaning the filtering members. In constructions of this class heretofore proposed the said cleaning air is delivered into the outer air so that it must overcome the atmospheric pressure, and the filtering apparatus cannot be used in connection with gas which is poisonous or otherwise injurious to the health.

The object of the improvements is to provide a filtering apparatus in which this objection is obviated, and with this object in view our invention consists in providing a tubular connection between the discharge opening of the cleaning air from the subsidiary set of filters and the passage through which the cleaned air is removed from the main filters. We have found that thereby an additional advantage is obtained in that the purifying action of the subsidiary set of filtering members is considerably supported by the vacuum within the air passage.

In order that a fan or blower of comparatively low size may be provided for supplying the purifying air we prefer to provide a gate or valve in the said tubular connection between the subsidiary set of filtering members and the passage through which the purified air is removed, which gate or valve is opened automatically or by hand when the cleaning air is admitted to one of the filtering chambers.

For the purpose of explaining the invention an example embodying the same has been shown in the accompanying drawings, in which the same letters of reference have been used in all the views to indicate corresponding parts. In said drawings, Fig. 1, is a sectional elevation showing the filtering apparatus, Fig. 2, is a sectional elevation taken on the line 2—2 of Fig. 1, Fig. 3, is a sectional elevation similar to Fig. 2 but on a larger scale to show the filter controlling apparatus, certain parts being also in different position.

Fig. 4, is a top plan view of Fig. 3,

Figure 1:
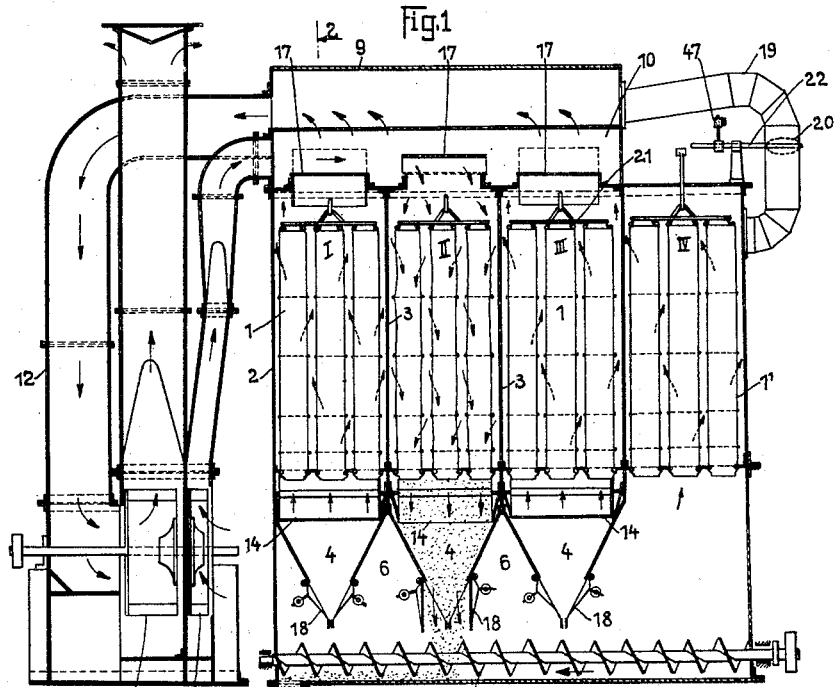
Figure 5:
Fig. 5, is an elevation showing the mechanism for shaking the tubular filtering members and the reversing mechanism for the gate or valve.
Figure 6:
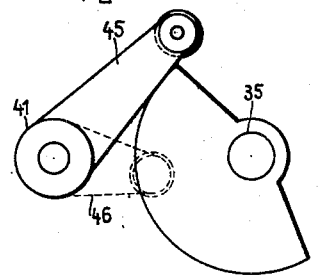
Fig. 6, is a plan view of the said reversing mechanism.

In the example shown in the drawings the tubular filtering members 1 are suspended from rods 21, and they are divided into three groups each comprising 3.5=15 members, and each group is confined within a chamber of the casing 2 enclosing all the filtering members, the said chambers indicated in the figures by the characters I, II and III being separated from one another by partitions 3. The tubular filtering members 1 are closed at their tops and open at their bottoms, and extend with their open ends through holes made in the bottoms of the chambers. Below each chamber there is a funnel 4 adapted to receive the dust deposited on and removed from the inner walls of the filtering members, and the said funnels open into a passage 6 having a screw conveyer 5 at its bottom. The passage enclosing the said screw conveyer is connected with an outlet 7 adapted to collect the dust supplied thereto by the screw conveyer. The outlet 7 is adapted to be closed in an air-tight manner by a gate 8.

Figure 2:
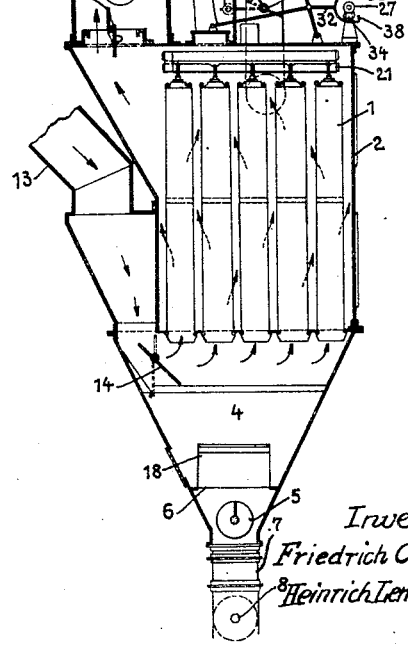

Above the filtering casing 2 there are two passages 9 and 10 extending the whole length of the casing. The passage 9 is connected by a pipe 12 with an exhaust fan adapted to produce a current of air through the tubular filtering members I—III connected with the passage 9. As is shown in Fig. 2, the passage 9 is provided with gates 15 one for each of the chambers I, II and III and in the position of the parts shown in the figures, the chambers I and III are connected with the passage 9, so that a current of air is produced from the funnels 4 of the said chambers, through the filtering members 1 thereof, the passage 9, and the pipe 12, the air loaded with dust being admitted to the said funnels through a passage 13 provided with automatic hinged gates 14. Thus the dust is deposited on the inner walls of the filtering members 1, while the purified air is removed through the passage 9.

While the filtering members are in operation the gates 15 are set into position for connecting the filtering chambers with the passage 9, as is shown in Fig. 2, and if it is desired to remove the dust from the filtering members, the said gates are set into position for disconnecting the filtering chambers from the passage 9, whereupon a counter-current of air is produced, as will be described hereafter.

For producing the said counter-current a second fan 16 is provided which, in the example shown in the drawings, is mounted on the same shaft as the exhaust fan 11. By means of the said fan 16 air under pressure is blown through the passage 10 and the chambers to be cleaned, gates 17 being provided for normally disconnecting the passage 10 from the chambers, as is shown in Fig. 2. If it is desired to clean one of the said chambers, the gate corresponding thereto is opened. In Fig. 1 the chamber II is connected with the passage 10. Thus compressed air is blown through the filtering members from the outside to the inside thereof, and the said air flows downwardly through the funnel 4 and into the passage 6. Within the said passage most of the dust is separated from the air, and the current of air is passed through a set of filtering members 1¹ contained in a separate chamber IV, the dust being deposited on the inner walls of the said filtering members. After some time the filtering members 1¹ are cleaned by shaking.

The outlets of the funnels 4 are provided with gates 18 adapted to be automatically closed by the vaccum produced within the funnels and to be opened by gravity when blowing compressed air through the filtering members for cleaning. The gates 14 through which the air loaded with dust is admitted to the funnels are automatically opened by the vacuum, and they are automatically closed by the compressed air. Thus, the dust separated from the filtering members when cleaning the same is prevented from passing into the passage 13 and into the adjacent filtering chambers. Thereby the reduction of the effect of the filtering members by supplying thereto the dust removed from other filtering members is avoided. In the drawings the gates 18 of the chambers I and III are closed, and the gate 18 of the chamber II is opened. The dust falling from the filtering members 1 by shaking the same drops through the funnels 4 and the open bottom parts thereof into the chamber 6 enclosing the screw conveyer 5, and it is conveyed thereby to the outlet 7.

The chamber enclosing the tubular filtering members 1¹ is connected by a pipe 19 with the passage 9 for directing the air from the said chamber to the passage 9. The pipe 19 includes a gate or valve 20 fixed to a rock shaft 22 located above the casing 2 and extending over all the compartments thereof, the said shaft being provided with a plurality of arms 23 one for each of the chambers I—III thereof, which arms are in engagement with hook-shaped arms 24 rockingly mounted on levers 29.

The rods 21 carrying the filtering members 1 of each chamber I to III are suspended by means of rods 21' from levers 26 rockingly mounted at 25 and adapted for engagement at their opposite ends with a rotary cam member mounted on a shaft 27 and comprising two arms 28. The lever 26 is adapted to be rocked with its left hand end upwardly and with its right hand end downwardly and out of position for engagement with the arms 28 by means of a supporting member 30 adapted to be rocked into position below an abutment 31 provided on the lever 26. The member 30 is thus rocked into position for supporting the lever 26 at the end of each cleaning operation by means of a lever 32 jointed to the lever 29. The said lever 32 is bifurcated at its right hand end and one arm of the bifurcated end of the lever is formed with a lug 33 adapted for engagement with a lug 34 mounted on the rotary shaft 27. Thus, when shifting the lever 32 by means of the lug 34 to the left the supporting member 30 is brought into position for lifting the lever 26. When again beginning the cleaning operation a cam 36 mounted on a rotary shaft 35 engages a lug 37 of the lever 32 and elevates the said lever with a lug 38 provided on the lower arm of the bifurcated end of the lever 32 into position for engagement with the lug 34, so that the lever 32 is shifted to the right, and the member 30 is retracted away from the lug 31 of the lever 26, and the tubular members 1 suspended from the lever 26 are adapted to move downwardly, and the right hand end of the lever 26 is lifted into position for engagement with the arms 28.

The lever 32 is connected by a rod 39 with the gate 17 disposed within the passage 10. The gate 15 is controlled by means of a rod 40 and an arm 42 rockingly mounted at 41 and connected with two arms 45 and 46 engaged by cam disks 43 and 44 secured to the shaft 35. The controlling faces of the said cams have such dimensions that the gate 15 is closed slightly before the fresh air gate 17 is opened, and that the gate 17 is again closed slightly before the gate 15 is opened.

Preferably, the time interval between closing one of the gates and opening the other one is such that in the meantime the air within the chamber has time to come to rest, and the dust is deposited. When pulling the bifurcated lever 32 cooperating with one of the filtering chambers away from the lug 34 and to the right, the hook-shaped rod 24 carries along the arm 23 and through the intermediary of the shaft 22 the gate 20 acted upon by a weighted body 47, said gate being within the pipe 19, is rocked into position for opening the pipe 19 thus permitting the purifying air to flow from the chamber IV into the passage 9 for the purified air. By reason of the loose engagement between the hook-shaped rods 24 of the other chambers with their arms 23 the shaft 22 carrying all the said arms can be rocked by one of the rods 24, the other rods 24 being merely lifted by such operation. When shifting the rod 32 to the right the gate 20 is returned into position for closing the passage 19 by the weighted body 47.

In our improved apparatus the power required for operating the fan or blower 11 connected with the passage 9 is not affected, because the purifying air to be taken in through the said passage is substantially equal in amount to the air consumed by the inoperative filtering chamber during the filtering operation.

We claim:

1. A filtering apparatus, comprising filtering chambers, filtering members in said filtering chambers, passages adapted to be connected with said chambers respectively at opposite sides of the filtering members, means to supply air or gas to be purified through one of said passages and into said chambers at one side of the filtering members and to remove the air or gas from the opposite side of said members and the passage connected therewith, a subsidiary filtering chamber comprising a filtering member and connected at opposite sides thereof respectively with said passages, means to produce a counter-current of air or gas through said main filtering chambers, through said subsidiary filtering chamber and through the passage through which the purified air is removed, and gates controlling the flow of said current and counter-current through said filtering chambers.

2. A filtering apparatus, comprising filtering chambers, filtering members in said filtering chambers, passages adapted to be connected with said chambers respectively at opposite sides of the filtering members, means to supply air or gas to be purified through one of said passages and into said chambers at one side of the filtering members and to remove the air or gas from the opposite side of said member and the passage connected therewith, a subsidiary filtering chamber comprising a filtering member and connected at opposite sides thereof respectively with said passages, means to produce a counter-current of air or gas through said main filtering chambers, through said subsidiary filtering chamber and through the passage through which the purified air is removed, gates controlling the flow of said current and counter-current through said filtering chambers, and a gate controlling the counter-current of air or gas from said subsidiary chamber to the passage through which the purified air is removed.

3. A filtering apparatus comprising a plurality of main filtering chambers each including filtering members, passages adapted to be connected with said chambers respectively at opposite sides of the filtering members, means for causing a current of air or gas loaded with dust to pass through one of said passages into said chamber and to remove the purified air or gas from the other passage, a subsidiary filtering chamber containing subsidiary filtering members, passages for connecting said subsidiary chamber at opposite sides of its filtering members respectively with said passages connected with said main chambers, means to cause a counter-current of air or gas to pass through said main filtering chambers, through said subsidiary filtering chamber and through the passage for the purified air, gates controlling said current and counter-current, a gate controlling the flow of the counter-current from said subsidiary filtering chamber to the passage for the purified air, and a loose connection between said gate and the gates controlling the supply of the counter-current to said main filtering chambers.

In testimony whereof we affix our signatures.

FRIEDRICH CLASEN.
HEINRICH LENCKERSTORF.